J. F. BYRNES.
VEHICLE SERVICE INDICATOR.
APPLICATION FILED NOV. 23, 1911.
1,090,382.
Patented Mar. 17, 1914.
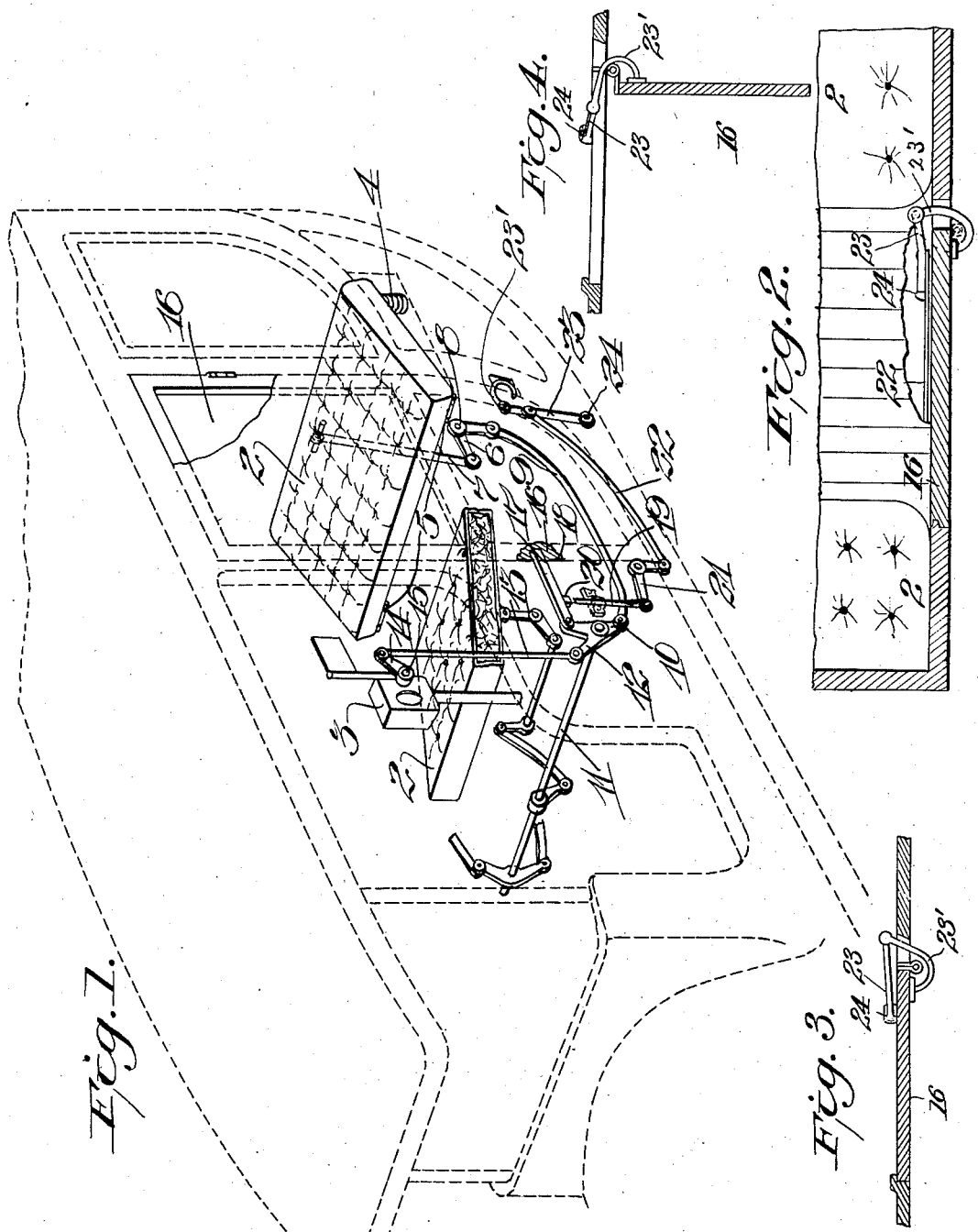
Witnesses.
Inventor.
John F. Byrnes.
by G. H. Strong.
Atty.

UNITED STATES PATENT OFFICE.

JOHN F. BYRNES, OF SAN FRANCISCO, CALIFORNIA, ASSIGNOR OF FORTY-FIVE ONE-HUNDREDTHS TO ROBERT COLEMAN AND TEN ONE-HUNDREDTHS TO F. M. McAULIFFE, BOTH OF SAN FRANCISCO, CALIFORNIA.

VEHICLE SERVICE-INDICATOR.

1,090,382.  Specification of Letters Patent.  Patented Mar. 17, 1914.

Application filed November 23, 1911. Serial No. 661,881.

*To all whom it may concern:*

Be it known that I, JOHN F. BYRNES, a citizen of the United States, residing in the city and in the county of San Francisco and State of California, have invented new and useful Improvements in Vehicle Service-Indicators, of which the following is a specification.

This invention relates to a device for the indication of the occupancy of a vehicle for hire.

The object of the present invention is to devise and provide a system or mechanism whereby the owners of vehicles for hire can be protected against fraud by their employees, the invention comprising a combination of elements coöperative with parts of the vehicle, such as an automobile, so as to positively make necessary the registration or actuation of a recording or timing device usually attached to vehicles of this type for hire.

The invention consists of the parts and the construction and combination of parts as hereinafter more fully described and claimed, having reference to the accompanying drawing, in which—

Figure 1 is a perspective view of the apparatus with the vehicle elements and parts shown in dotted lines. Fig. 2 is a detail showing in horizontal section a part of the car and the door thereof and showing means for actuating the latch bolt. Fig. 3 is a horizontal section of the door and the operating means showing a fragment of the side of the door. Fig. 4 is a similar view showing the door in its open position.

It is a desideratum to combine with a vehicle for hire, such as a taxicab or automobile, a mechanism rendering the letting of the car by its chauffeur or driver impossible without registering or indicating. To that end I have shown a combination of mechanical elements, certain of which are disposed with relation to the seats 2 of a vehicle, so that when the seat is occupied, it will positively actuate a semaphore or other registering device of suitable character, as 3, without the aid of the attendant of the car or vehicle.

In the present instance the seats 2 are shown as yieldably supported upon springs 4; the seats being hinged, as at 5, to a convenient part of the vehicle frame, and when the occupant takes a seat, the latter will be sufficiently depressed to actuate a crank or lever 6, which is connected to its respective seat by a link 7. The crank 6 is fulcrumed upon a suitable support 8, and to one arm of the crank there is connected an appropriate link 9 reaching downwardly and forwardly beneath the body of the car, and having connected to its other end an arm 10 of a lever fulcrumed on the transverse rod or rocker shaft 11 mounted in appropriate bearings in the body of the vehicle. An upwardly extending arm 12 of the lever 10 is connected by a link 13 to an arm 14, which is connected to a rocker shaft 15 controlling the mechanism in the indicating or timing device 3.

Usually taxicabs and other vehicles for hire are provided with a timing or registering device and a semaphore, and the driver of the vehicle is instructed to turn a releasing lever, as 14, forming a part of the registering device 3, so as to permit the operating of the timing mechanism. If the vehicle driver be inclined toward dishonesty, he may omit to release the timing mechanism for operation when taking up a passenger, and can thereby retain the proceeds of the use of the vehicle derived from the passenger without turning an accounting into the proprietor of the vehicle.

It is one of the important purposes of this invention to insure protection of the proprietor and obtain an accounting of the use of the vehicle, by so connecting the registering device, as 3, that when a passenger seats himself on one of the seats 2, the latter, through means of the connections hereinbefore described, will automatically release the timing mechanism for operation, thereby positively preventing fraud on the part of the chauffeur or driver.

The several seats of the vehicle are each respectively connected by appropriate links and levers to rock the rocker shaft 11 whenever any one of the seats is occupied, so that it is immaterial which of the seats a passenger may take.

Another important feature of the present device is the provision of means whereby the vehicle door 16, of which there is one usually on each side, is normally locked or designed to be locked so long as the registering device 3 is in inoperative or idle position. In this instance, the door 16 is designed to be engaged by a sliding bolt 17 movable in the jamb 18 of the body, and the bolt is shown as connected to a lever 10, thereby being withdrawn to release or unlock the door 16 whenever the rocker shaft 11 is moved; thus, the door 16 will be unbolted either by the operation of the shaft 15 of the timing device 3 by the operator, or the door will be released when the passenger assumes a position on one of the seats 2 of the vehicle, since this latter is positively connected to and rocks the shaft 11. Thus, it will be seen that in order for the chauffeur to admit a passenger to the vehicle, he must first unbolt a door 16, which can only be done by rocking the timing device shaft 15, or in some manner depressing one of the seats 2. In either event, the release of the timing device 3 will automatically record, so that the proprietor may read the record and obtain an accounting of the use of the vehicle.

For the purpose of preventing the chauffeur from leaving the door 16 ajar, and thus attempting to cheat the proprietor, there is provided a detent 19 movable upwardly against a lug 20 on the lower side of the bolt 17; the detent 19 being connected to a lever or suitable device 21 by a link 22 and lever 23 to the door 16. The lever, 23, is fulcrumed at 24 and has jointed to its upper end the curved arm, 23', which arm extends through an opening in a wall of the vehicle casing to the outside of the casing, at which point the arm is reversely curved so as to bear against the outside of the door adjacent the hinged end whereby during the opening movement of the door about its hinges, a forward movement is given the joint between the curved arm, 23', and the upper end of the lever, 23, and this forces the lever, which is on the inside of the vehicle forwardly transmitting its motion through the link, 22, which link passes through the floor of the vehicle and connects with the bell crank, 21. The object of the construction just specified is that the door cannot be opened while the bolt 17 is in locking position for the reason that the projection 20 of the bolt is immediately in position above the detent 19 and this is so connected to the door that it is designed to rise as the door is opened. If the bolt 17 be unretracted, the detent 19 cannot rise, nor can the door 16 be opened. As soon as the operator manipulates the lever 14 to which the semaphore may be connected, the link 13 will rock the rocker shaft 11 to retract the bolt 17, releasing the door and permitting the latter to be swung open about its hinges.

As the door is opened to admit a passenger, its peculiarly connected lever 23 will rock about a fulcrum 24 and push the link 22, thus lifting the detent 19 so that its upper end is projected in front of the spur or lug 20 on the lower edge of the bolt 17. Now, so long as the door is partly or entirely open, the detent 19 will interrupt the projection of the bolt 17 forwardly; this projection being accomplished simultaneously by the upward movement of the indicator arm 14, so that if the dishonest chauffeur should attempt to place a passenger in the vehicle, after having momentarily turned the semaphore lever 14 downward to permit the opening of the door, and then try to raise the semaphore arm 14 while the door is standing open, the interposition of the stop member 19 would effectually prevent the upward movement of the semaphore arm 14, by reason of its engagement limiting the movement of the spur 20 and bolt 17.

Manifestly the mechanical details of the present invention may be varied to permit the application of the invention to vehicles of various types, so long as the function of the invention, to prevent the use of the car without a proper record thereof, will be permitted, and it is understood that any suitable form of indicating, registering or timing device 3 may be employed.

Having thus described my invention, what I claim and desire to secure by Letters Patent is—

1. An apparatus for the indication of the letting of vehicles, said apparatus comprising a suitable timing and indicating device, means controlled by the seating of a passenger to actuate said device, and means controlled by the door of the vehicle to interrupt a movement of said device.

2. An apparatus for the indication of the letting of vehicles, said apparatus comprising a suitable timing and indicating device, means connected to and operable by the seats of the vehicle to actuate said device, and connections between the door of the vehicle and said apparatus to interrupt a movement of the latter.

3. The combination with a vehicle having seats for the reception of passengers, of a suitable registering device, connections between said device and the door of the vehicle for interrupting a movement of said device, and means connected to the sides of the vehicle and to said connections for actuating said device.

4. The combination with a vehicle having seats for the reception of passengers, of a suitable registering device, connections between said device and the door of the vehicle, and means connected to said seats for controlling said device, said connections comprising a bolt engageable at one end with said levers to the aforesaid device, and links and levers actuated by one of the seats and moving said first named lever.

5. The combination with a vehicle having seats for the reception of passengers, of a suitable registering device, connections between said device and the door of the vehicle, and means connected to said seats for controlling said device, said connections comprising a bolt engageable at one end with the edge of the door and connected to the first named lever.

In testimony whereof I have hereunto set my hand in the presence of two subscribing witnesses.

JOHN F. BYRNES.

Witnesses:
DAN O'CALLAGHAN,
EDWARD G. MCSHANE.